United States Patent [19]

Watanabe et al.

[11] 4,379,852

[45] Apr. 12, 1983

[54] BORIDE-BASED REFRACTORY MATERIALS

[75] Inventors: Tadahiko Watanabe, Saga; Shinichi Kono, Ikoma, both of Japan

[73] Assignee: Director-General of the Agency of Industrial Science and Technology, Tokyo, Japan

[21] Appl. No.: 241,235

[22] Filed: Mar. 6, 1981

[30] Foreign Application Priority Data

Aug. 26, 1980 [JP] Japan .................................. 55-117362

[51] Int. Cl.³ .............................................. C04B 35/58
[52] U.S. Cl. ........................................ 501/87; 501/89; 501/91; 501/92; 501/93; 501/96; 501/98
[58] Field of Search ....................... 501/87, 89, 91, 92, 501/93, 96, 98

[56] References Cited

U.S. PATENT DOCUMENTS

| | | | |
|---|---|---|---|
| 2,406,275 | 8/1946 | Wejnarth | 501/92 |
| 2,412,373 | 12/1946 | Wejnarth | 501/92 |
| 2,412,374 | 12/1946 | Wejnarth | 501/92 |
| 2,412,375 | 12/1946 | Wejnarth | 501/92 |
| 2,412,376 | 12/1946 | Wejnarth | 501/92 |
| 2,802,748 | 8/1957 | Glaser | 501/96 |
| 3,340,077 | 9/1967 | Alper | 501/92 |
| 3,433,471 | 3/1969 | Alper | 501/98 |
| 4,259,119 | 3/1981 | Watanabe et al. | 501/96 |
| 4,292,081 | 9/1981 | Watanabe et al. | 501/96 |

*Primary Examiner*—Mark Bell
*Attorney, Agent, or Firm*—Brisebois & Kruger

[57] ABSTRACT

The invention provides a novel highly refractory sintered body based on a metal diboride such as $TiB_2$ or $Mo_2B_5$ and $W_2B_5$ containing a binder ingredient. The high-temperature performance of the sintered body is further improved by including an auxiliary additive ingredient selected from several carbides, nitrides, silicides and oxides such as WC, TiC, TaN, TiN, $MoSi_2$, $TiO_2$, $Al_2O_3$, $B_2O_3$ and the like in a limited amount.

6 Claims, No Drawings

BORIDE-BASED REFRACTORY MATERIALS

BACKGROUND OF THE INVENTION

The present invention relates to a boride-based refractory material or, more particularly, to a boride-based refractory material having remarkably improved mechanical strengths and hardness at high temperatures as well as high heat resistance based on a metal diboride of the $MB_2$ type or an equivalent boride such as $M_2B_5$ type boride as the base component.

Among various classes of highly refractory materials, metal diboride-based ones belong to one of the most promising classes owing to their high melting points and high hardness as well as sufficiently high mechanical strengths at high temperatures in general so that their application to cutting tools and building materials for internal combustion engines and rockets and the like is now under rapid development. On the contrary to the above mentioned excellent properties of the metal diboride-based refractory materials, they are rather defective of the brittleness and low bending strength, especially, when the refractory material is composed essentially of a metal diboride of the $MB_2$ type or a metal boride of the $M_2B_5$ type which may be crystallographically equivalent to the $MB_2$ type diboride at elevated temperatures.

Extensive investigations have hitherto been undertaken to develop a metal diboride-based refractory material fully exhibiting the excellent properties inherent to the metal diborides and still free from the above mentioned defects of brittleness or low bending strength of the prior art materials. The investigations have been directed to the improvement of the material by the addition of a suitable binder component to a metal diboride and there have been proposed several kinds of binders which may be an alloy of nickel and phosphorus or a boride of nickel, iron, cobalt, manganese or titanium. There has further been disclosed that a metal boride of the $M_2B_5$ type such as $W_2B_5$ and $Mo_2B_5$, which has the same crystallographic structure at high temperatures as the metal diborides of the $MB_2$ type, is more advantageous in a sintered refractory material in respect of the mechanical strengths at high temperatures (see, for example, copending U.S. applications Ser. Nos. 89,487, 973,957 and 127,434 now U.S. Pat. Nos. 4,259,119; 4,246,027; and 4,292,081, respectively).

It is of course desirable to obtain a metal diboride-based refractory material having still higher strengths than those obtained in the above described impoved formulations and the inventors have continued their efforts to discover more preferable formulations for a high-strength refractory material on the base of a metal diboride.

SUMMARY OF THE INVENTION

As a result of the above mentioned continued efforts undertaken by the inventors, it has been unexpectedly discovered that the mechanical strengths of the metal diboride-based refractory materials can further be improved by the addition of a suitable amount of an additive ingredient which may be a carbide, oxide, silicide or nitride of specified elements as defined hereinafter.

The metal diboride-based refractory material of the invention comprises the components of (a) at least one metal boride selected from the group consisting of the $MB_2$ type diborides of titanium, vanadium, niobium, tantalum, chromium, molybdenum, manganese, zirconium, hafnium and aluminum and $M_2B_5$ type borides of molybdenum and tungsten, (b) from 0.01 to 50% by weight of at least one binder ingredient selected from the group consisting of the borides of nickel, iron, cobalt, manganese and titanium other than the $MB_2$ type diborides and alloys of nickel and phosphorus, and (c) from 0.1 to 50% by weight of at least one additive ingredient selected from the group consisting of (c-1) carbides expressed by the formulas TiC, ZrC, HfC, VC, NbC, TaC, $Ta_2C$, $Mo_2C$, MoC, $Cr_3C_2$, $B_4C$, $W_2C$, WC and SiC;

(c-2) silicides expressed by the formulas $MoSi_2$, $WSi_2$, CrSi, $CrSi_2$, $Cr_3Si$, $TaSi_2$, $NbSi_2$, $VSi_2$, $ZrSi_2$ and $TiSi_2$;

(c-3) nitrides expressed by the formulas TiN, TaN, $Ta_2N$, ZrN, HfN, VN, $V_3N$, NbN, $Nb_2N$, CrN, $Cr_2N$, $Mo_2N$ and MoN; and (c-4) oxides expressed by the formulas $Al_2O_3$, $B_2O_3$, $SiO_2$, $Cr_2O_3$, TaO, VO, NbO, BeO, TiO, $TiO_2$, $Ti_2O_3$, $ZrO_2.SiO_2$, $Al_2O_3.TiO_2$, $MgO.Al_2O_3$, $ThO_2.ZrO_2$, $3Al_2O_3.SiO_2$ and $(Mg,Fe)(Al,Cr)_2O_4$, the balance being substantially the metal boride as the component (a).

Further improvement in the mechanical strengths of the metal diboride-based refractory materials of the above defined formulation is obtained when the composition additionally contains (d) up to 40% by weight, based on the total amount of the sintered material, of a MB type boride of a metal selected from the group consisting of tantalum, niobium, tungsten, zirconium, hafnium, molybdenum and vanadium.

DETAILED DESCRIPTION OF THE PREFERRED EMBODIMENTS

As is described above, the inventive metal diboride-based refractory material is basically composed of the base boride as the component (a), the binder ingredient as the component (b) and the auxiliary additive ingredient as the component (c) in the above specified proportion, optionally, with addition of the MB type boride as the component (d) partially substituting for the base component (a). The addition of this component (d) is preferable when further increased strength of the refractory material is desired and such an additional improvement is obtained by adding 0.1% by weight or more of the component (d) while an amount in excess of 40% by weight is undesirable due to the increased difficulty in sintering the composition into refractory bodies.

The amount of this base component constitutes the balance of the other components but it is preferable that the amount of the $MB_2$ and/or $M_2B_5$ type boride or borides is at least 30% by weight of the total formulation. Among the above named 10 kinds of the metal diborides, titanium diboride is preferred solely for the reason of less expensiveness than the other diborides which also can give equally excellent refractory bodies.

The base component, i.e. the component (a) with optional admixture of the component (d), is used as a fine powder having a particle size distribution of 5 μm or smaller in the average particle diameter.

The binder ingredient as the component (b) is essential to facilitate sintering of the composition so that it should be used in an amount of at least 0.01% by weight based on the total amount of the composition to be sintered while an amount in excess of 50% by weight of the binder ingredient is undesirable due to the decreased heat resistance of the resultant sintered refractory bodies. The amount of this binder ingredient is preferably in the range from 0.1 to 20% by weight when the refractory body is prepared by the techniques of so-called hot pressing and in the range from 15 to 40% by weight when the refractory body is prepared by the method of sintering a green body shaped by compression molding in cold or by the method of so-called infiltration.

The binder ingredient as the component (b) is, as is described above, selected from the borides of nickel, cobalt, iron, manganese and titanium as well as alloys of nickel and phosphorus. Suitable borides of nickel are exemplified by $NiB$, $Ni_4B_3$, $Ni_2B$ and $Ni_3B$, cobalt borides are exemplified by $CoB$, $Co_2B$ and $Co_3B$, iron borides are exemplified by $FeB$ and $Fe_2B$, manganese borides are exemplified by $MnB$, $Mn_3B_4$, $Mn_2B$ and $Mn_4B$, and titanium borides are exemplified by $TiB$, $Ti_2B$ and $Ti_2B_5$. These borides may be used either singly or as a mixture of two kinds or more. Particularly suitable metal borides among them are $NiB$, $Ni_4B_3$, $CoB$, $FeB$, $TiB$ and $MnB$. The alloy of nickel and phosphorus used as the component (b) is obtained by adding from 3 to 25% by weight of phosphorus to nickel. It is of course optional that the binder ingredient as the component (b) is a combination of one or more of the metal borides as defined above and the nickel-phosphorus alloy. Among the above named borides suitable as the binder ingredient, $MnB$, $TiB$, $NiB$, $Ni_4B$, $CoB$ and $FeB$ are more preferable.

It should be noted that the above defined binder ingredient is not necessarily added in the form described above as such but may be a mixture of the components from which the above mentioned borides or the alloys can be formed during the sintering procedure. For example, a metal such as nickel, cobalt, iron, manganese and titanium may be added as combined with elementary boron so as that the desired metal boride is formed by the reaction between the metal and the boron during sintering.

The auxiliary additive ingredient as the component (c), which is formulated in an amount from 0.1 to 50% by weight or, preferably, from 1 to 30% by weight, is selected from the above named carbides, silicides, nitrides and oxides. Among the above named ones, $WC$, $TiC$, $TaC$, $NbC$, $VC$ and $ZrO_2$ are more preferable and the nitrides such as $TiN$, $ZrN$, $TaN$ and $VN$ are effective to improve the impact strength of the sintered refractory body. $MoSi_2$, $ZrSi_2$, $B_2O_3$ and $Al_2O_3$ are less preferable. These auxiliary additive ingredients should have a particle diameter not to exceed 5 $\mu m$. These ingredients may be added either alone or as a combination of two kinds or more.

The sintered refractory body of the invention is manufactured as follows. The individual components are taken in calculated amounts and uniformly blended to give a powdery composition. A mold made of, for example, graphite is filled with the powder composition and sintering of the composition is carried out by heating the composition in the mold at a temperature of 1000° C. or higher or, preferably, from 1700° to 1800° C. under a pressure of at least 50 kg/cm² or preferably, at least 200 kg/cm² in vacuum or in an inert or reducing atmosphere of argon or hydrogen for about 10 minutes or longer. Instead of the above described so-called hot-pressing, it is of course possible that a green body is first shaped by compression molding a room temperature with the powder composition and the green body of the desired form is then subjected to sintering under atmospheric pressure otherwise with the above described conditions into a sintered body.

Further alternatively, the techniques of the so-called infiltration are applicable in this case. That is, the metal diboride and/or the $M_2B_5$ type boride with optional admixture of $MB$ type borides are blended with the auxiliary additive ingredient of the carbides, nitrides, silicides or oxides and the powder blend is first shaped and sintered without the binder ingredient followed by dipping of the thus sintered body in a melt of the binder ingredient so as that the molten binder is soaked in the sintered body resulting in the desired sintered body.

In any way, the sintered refractory body of the invention always has a relative density of approximately 100% and is excellent in the mechanical strengths, hardness and heat resistance and advantageously utilized for the manufacture of cutting tools or as a structural material of internal combustion engines, rockets and the like.

Following are the examples to illustrate the present invention in further detail.

EXAMPLE (EXPERIMENTS NO. 1 to NO. 43)

One or two kinds of the base borides selected from the $MB_2$ type and $M_2B_5$ type borides always including titanium diboride $TiB_2$ were admixed with a binder boride, i.e. $CoB$, $NiB$, $FeB$ or $TiB$, and one to three kinds of the auxiliary additive ingredients selected from the carbides, nitrides, silicides and oxides. The kinds of the admixed ingredients in each of the experiments excepting titanium diboride are shown in the accompanying table with the amount of each of the ingredients indicated in brackets in % by weight, the balance being the amount of titanium diboride. In Experiment No. 22, tantalum boride $TaB$ was used to partially substitute for the $MB_2$ or $M_2B_5$ type borides.

A graphite mold was filled with the thus well blended powder mixture which was sintered under compression with a pressure of 200 kg/cm² for 30 minutes. The heating temperature was 1700° C. in all of the Experiments excepting No. 2 in which the sintering was carried out at 1800° C. The atmosphere of sintering was evacuated to vacuum in all of the Experiments excepting No. 21 in which the sintering was carried out in an atmosphere of argon.

All of the sintered bodies obtained in this manner had a relative density of almost 100% of the theoretical value. The sintered bodies were subjected to the measurements of the bending strength and the Vickers hardness both at room temperature and at 1000° C. to give the results shown in the table.

TABLE

| Exp. No. | Component | | | Bending strength, kg/mm² | Vickers hardness, kg/mm² | |
|---|---|---|---|---|---|---|
| | a* (%) | b (%) | c (%) | | at room temp. | at 1000° C. |
| | (Part I) | | | | | |
| 1 | $Mo_2B_5$ (3) | $CoB$ (1) | $Mo_2C$ (3) | 220 | 3000 | 2000 |
| 2 | $W_2B_5$ (5) | $CoB$ (1) | $WC$ (5) | 200 | 2800 | — |

TABLE-continued

| Exp. No. | Component a* (%) | b (%) | c (%) | Bending strength, kg/mm$^2$ | Vickers hardness, kg/mm$^2$ at room temp. | Vickers hardness, kg/mm$^2$ at 1000° C. |
|---|---|---|---|---|---|---|
| 3 | TaB$_2$ (5) | CoB (1) | WC (5) | 186 | — | — |
| 4 | Mo$_2$B$_5$ (3) | CoB (1) | TiC (5) | 226 | 2900 | 2000 |
| 5 | TaB$_2$ (5) | CoB (1) | TiC (1.7) | 230 | 3000 | 2100 |
| 6 | TaB$_2$ (5) | CoB (1) | TiC (3) | 230 | — | — |
| 7 | TaB$_2$ (5) | CoB (1) | Mo$_2$C (3) | 210 | 2900 | 2000 |
| 8 | TaB$_2$ (5) | CoB (1) | TaN (5) | 198 | — | — |
| 9 | TaB$_2$ (5) | CoB (1) | TaN (10) | 228 | 2910 | 2000 |
| 10 | TaB$_2$ (5) | CoB (1) | TaN (20) | 182 | — | — |
| 11 | TaB$_2$ (5) | CoB (1) | TaN (30) | 178 | — | — |
| 12 | TaB$_2$ (5) | CoB (1) | TiN (6) | 188 | — | — |
| 13 | TaB$_2$ (5) | CoB (1) | TiN (2) | 185 | — | — |
| 14 | TaB$_2$ (5) | CoB (1) | TiC (3) TaN (10) | 200 | — | — |
| (Part II) | | | | | | |
| 15 | TaB$_2$ (5) | CoB (1) | TiC (3) TaN (20) | 204 | — | — |
| 16 | TaB$_2$ (5) | CoB (1) | TiC (1.7) TaN (5) | 250 | 3000 | 2100 |
| 17 | TaB$_2$ (5) | CoB (1) | TiC (1.7) TaN (10) | 250 | — | — |
| 18 | TaB$_2$ (5) | CoB (1) | TiC (1.7) TaN (20) | 196 | — | — |
| 19 | TaB$_2$ (5) | CoB (1) | MoSi$_2$ (5) | 194 | — | — |
| 20 | Mo$_2$B$_5$ (3) | CoB (1) | MoSi$_2$ (3) | 172 | — | — |
| 21 | — | NiB (1) | MoSi$_2$ (5) | 164 | — | — |
| 22 | TaB** (5) | TiB (1) | TiC (3) TaN (5) MoSi$_2$ (3) | 200 | 2900 | 2000 |
| 23 | TaB$_2$ (5) | CoB (1) | TiO$_2$ (5) | 190 | 3000 | 2000 |
| 24 | VB$_2$ (5) | FeB (1) | Ti$_2$O$_3$ (5) | 180 | — | — |
| 25 | CrB$_2$ (5) | CoB (1) | TiO (5) | 174 | — | — |
| 26 | TaB$_2$ (5) | CoB (1) | TiC (1.7) TaN (5) TiO$_2$ (5) | 230 | 3200 | 2100 |
| 27 | TaB$_2$ (5) | CoB (1) | B$_2$O$_3$ (5) | 180 | — | — |
| 28 | TaB$_2$ (5) | CoB (1) | WC (1) | 160 | — | — |
| 29 | TaB$_2$ (5) | CoB (1) | WC (2.5) | 144 | — | — |
| (Part III) | | | | | | |
| 30 | TaB$_2$ (1) | CoB (1) | WC (10) | 160 | 3100 | 2200 |
| 31 | — | CoB (1) | WC (2.5) | 200 | 2800 | 2000 |
| 32 | — | CoB (1) | WC (5) | 200 | — | — |
| 33 | — | CoB (1) | WC (10) | 200 | — | — |
| 34 | — | CoB (1) | TiC (10) | 140 | 2800 | 2000 |
| 35 | — | CoB (1) | TiC (20) | 140 | — | — |
| 36 | Mo$_2$B$_5$ (3) | CoB (1) | Mo$_2$C (3) | 210 | 2910 | 2000 |
| 37 | TaB$_2$ (5) | CoB (3) | B$_4$C (5) | 150 | 2800 | — |
| 38 | TaB$_2$ (5) | CoB (1) | TaC (5) | 200 | 3000 | 2200 |
| 39 | TaB$_2$ (5) | CoB (1) | NbC (5) | 200 | 3000 | 2200 |
| 40 | TaB$_2$ (5) | CoB (1) | VC (5) | 200 | 3000 | 2200 |
| 41 | TaB$_2$ (5) | CoB (1) | VN (5) | 180 | 2800 | — |
| 42 | TaB$_2$ (5) | CoB (1) | ZrO$_2$ (2) | 230 | 3000 | 2100 |
| 43 | TaB$_2$ (5) | CoB (1) | ZrO$_2$ (2) WC (2) TaN (5) | 230 | 3100 | 2100 |

*Other than titanium diboride.
**TaB was used in place of part of the component (a).

What is claimed:

1. A refractory sintered body composed essentially of
   (a) at least 30% by weight of at least one metal boride selected from the group consisting of MB$_2$ type diborides of titanium, vanadium, niobium, tantalum, chromium, molybdenum, manganese, zirconium, hafnium, and aluminum and M$_2$B$_5$ type borides of molybdenum and tungsten,
   (b) from 0.01 to 50% by weight of at least one binder ingredient selected from the group consisting of the borides of nickel, iron, cobalt, manganese and titanium other than the MB$_2$ type diborides and alloys of nickel and phosphorus, and
   (c) from 0.1 to 50% by weight of at least one additive ingredient selected from the group consisting of WC, TiC, TaC, NbC, VC, ZrO$_2$, TiN, ZrN, TaN, and VN, the balance being substantially the metal boride of the component (a), or
   (d) the metal boride of the component (a) and up to 40% by weight, based on the sintered body, of at least one MB type boride of a metal selected from the group consisting of tantalum, niobium, tungsten, zirconium, hafnium, molybdenum, and vanadium.

2. The refractory sintered body as claimed in claim 1 wherein the binder ingredient as the component (b) is selected from the group consisting of MnB, TiB, NiB, Ni$_4$B, CoB and FeB.

3. The refractory sintered body as claimed in claim 1 in which the balance is substantially the metal boride of the component (a).

4. The refractory sintered body as claimed in claim 1 in which the balance is substantially the metal borides of the component (d).

5. The refractory sintered body of claim 1 or claim 4 which contains $MB_2$ type titanium diboride.

6. The refractory sintered body of claim 1 having a bending strength greater than 200 $Kg/mm^2$, and a Vickers hardness of at least 2000 at 1000° C.

* * * * *